No. 886,284. PATENTED APR. 28, 1908.
S. A. WILSON.
TRUCK.
APPLICATION FILED JUNE 15, 1907.
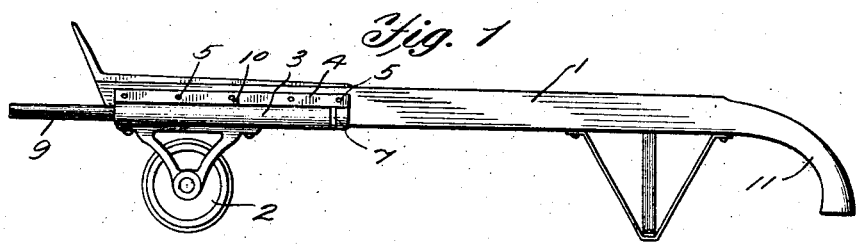
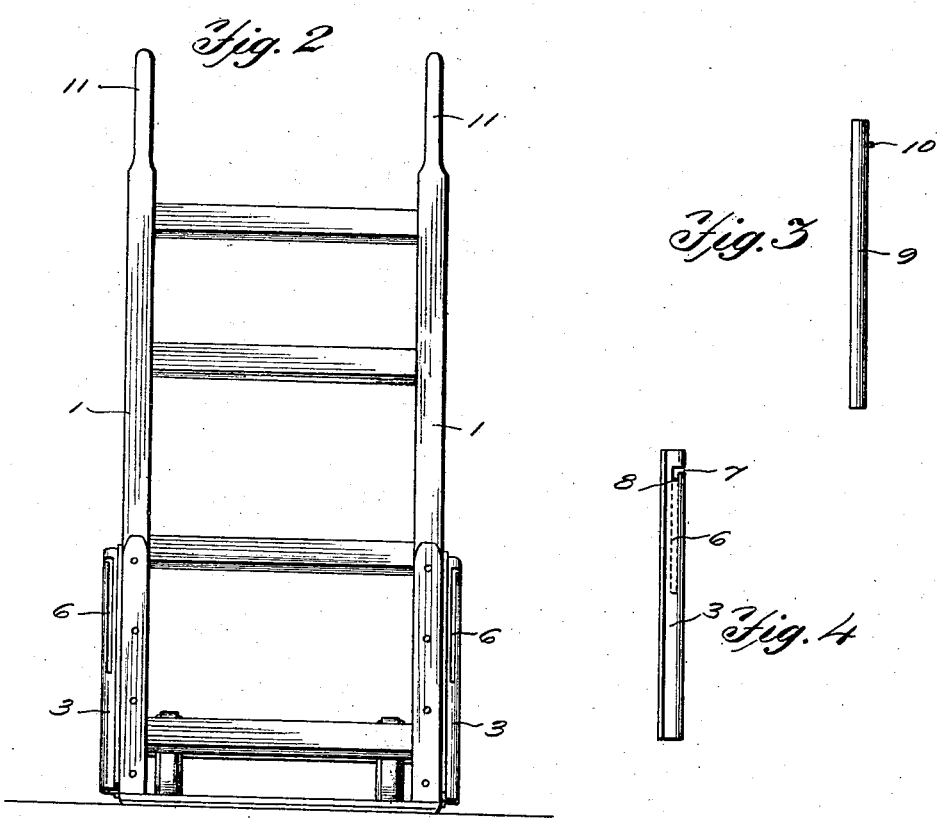
Witnesses
Inventor
Samuel A. Wilson
By Victor J. Evans
Attorney

UNITED STATES PATENT OFFICE.

SAMUEL A. WILSON, OF PETOSKEY, MICHIGAN.

TRUCK.

No. 886,284.  Specification of Letters Patent.  Patented April 28, 1908.

Application filed June 15, 1907. Serial No. 379,223.

*To all whom it may concern:*

Be it known that I, SAMUEL A. WILSON, a citizen of the United States of America, residing at Petoskey, in the county of Emmet and State of Michigan, have invented new and useful Improvements in Trucks, of which the following is a specification.

This invention relates to trucks of the hand operated type, and one of the principal objects of the same is to provide means for handling a trunk or other piece of baggage placed upon the truck, said means comprising extensible handles secured to the sides of the truck frame and adapted to be slid out from their keepers to provide convenient means for lifting the truck and the piece of baggage upon the same and carrying it to its place of destination.

In handling large trunks it is found extremely difficult to carry the trunk up a flight of stairs provided it should be too heavy for a single person to carry. Moreover the handles provided on trunks are often weak and many times become detached from the trunk. Under these conditions it is difficult to get a hand hold on the trunk for carrying it upstairs.

One of the principal objects of my invention is to provide a truck to overcome the difficulties referred to.

In the accompanying drawing, Figure 1 is a side view of a hand operated truck made in accordance with my invention, and showing the handle bars projected in position for use. Fig. 2 is a front elevation of the truck showing the handle bars retracted. Fig. 3 is a detail side view of one of the handle bars. Fig. 4 is a similar view of the barrel or keeper for the handle bars.

Referring to the drawing for a more particular description of my invention, the numeral 1 designates the side bars of a hand operated truck mounted on wheels 2, said truck being of the ordinary construction.

Mounted on each of the side bars 1 at a point near the front end of the truck is a barrel or keeper 3 provided with a flange 4 which is secured by screws or other suitable fastenings 5 to the side bars 1. The barrel 3 is provided with a longitudinal slot 6, and at the upper end of said slot is a cross slot 7 having a downwardly extending branch 8. The handle bars 9 are fitted to slide in the barrels 3, said handle bars each having a projecting lug 10 adapted to slide in the slot 6 and to be locked in its retracted position when the lug 10 is located in the branch 8 of said slot. When the handle bars are retracted within the barrels 3, the truck may be used as an ordinary truck. When a heavy trunk or other piece of baggage is to be transferred to a room in a hotel, the trunk may be placed upon the truck and the handle bars 9 extended so that one person can grasp the handle bars 9 and proceed up the stairs while the other person can grasp the handles 11 and under these conditions the trunk can be readily carried upstairs and deposited in the room.

My invention is of comparatively simple construction, and adds but little to the original cost of the truck, while the invention is particularly convenient for the purpose referred to.

Having thus described the invention, what I claim is:

A hand operated truck mounted on wheels and provided with forwardly extensible handle bars comprising keepers secured to the side bars of the truck, and each provided with a longitudinal slot and a branch slot, extensible handle bars mounted to slide in said keepers and provided with a lug to slide in said slot and branch, substantially as described.

In testimony whereof, I affix my signature in presence of two witnesses.

SAMUEL A. WILSON.

Witnesses:
J. W. WILCOXEN,
C. E. FRENCH.